CRYOGENIC MEMORY APPARATUS

Filed July 5, 1963 3 Sheets-Sheet 1

INVENTOR
GERALD B ROSENBERGER
BY *Frederick D. Poag*
ATTORNEY

May 24, 1966 G. B. ROSENBERGER 3,253,159

CRYOGENIC MEMORY APPARATUS

Filed July 5, 1963 3 Sheets-Sheet 2

3,253,159
Patented May 24, 1966

3,253,159

CRYOGENIC MEMORY APPARATUS

Gerald B. Rosenberger, Saugerties, N.Y., assignor to International Business Machines Corporation, New York, N.Y., a corporation of New York Filed July 5, 1963, Ser. No. 292,841
8 Claims. (Cl. 307—88.5)

This invention relates to cryogenic memory devices and more particularly to means for employing hysteresis effects in cryotrons for information storage.

Many prior art cryogenic memory schemes employ the phenomenon of persistent current in a superconducting loop, in such manner that the presence or absence, or direction, of the current in the loop is indicative of one or another of the states of binary information which may be stored. Generally speaking, the readout of such memory devices is destructive of the information stored, and in many cases the readout scheme is slowed by the switching of a current from one path of considerable inductance to another.

In accordance with the present invention, means employing hyteresis in lieu of the persistent current phenomena are provided, in such manner that high speed, non-destructive readout characteristics are afforded.

Preferred embodiments of the invention, as hereinafter more particularly described, provide means for sensing the conductivity of a cryogenic element either by actually measuring its resistance or by detecting its efficiency as a magnetic shield. In either case, the state of the element, superconductive or resistive, is determined in a manner which is non-destructive because it is the static condition of the cryogenic element in its hysteresis loop which is indicative of the information stored rather than some dynamic situation in the circuit. Similarly, since the only current alteration upon readout occurs in the sense circuit itself, inductance problems tending to slow operation of cryogenic memories are minimized.

Accordingly, a major object of the invention is to provide improved cryogenic memory apparatus employing hysteresis effects.

Another object of the invention is to provide improved cryogenic apparatus employing hysteresis in the conductivity switching characteristics of a cryogenic element for storage of binary information.

Still another object of the invention is to provide an improved cryogenic apparatus which is so constructed that, in the quiescent state of the apparatus a cryogenic element thereof tends to stay in one or another of binary conductivity states by reason of hysteresis in a switching characteristic of the element.

Yet another object of the invention is to provide in apparatus as aforedescribed a simple and straightforward memory organization having capabilities for addressing a location in memory for writing and reading operations together with an arrangement of lines for corresponding "write 1," "write 0" and "read" operations for high speed storage of information and high speed, non-destructive readout of the same.

Still another object of the invention is to provide another cryogenic memory organization utilizing the aforedescribed hysteresis effects in a manner whereby the variation in shielding effect of the cryogenic element undergoing hysteresis is the means employed for affecting meaningfully the sense output circuit.

The foregoing and other objects, features and advantages of the invention will be apparent from the following, more particular description of the preferred embodiments of the invention, as illustrated in the accompanying drawings.

Figure 6:
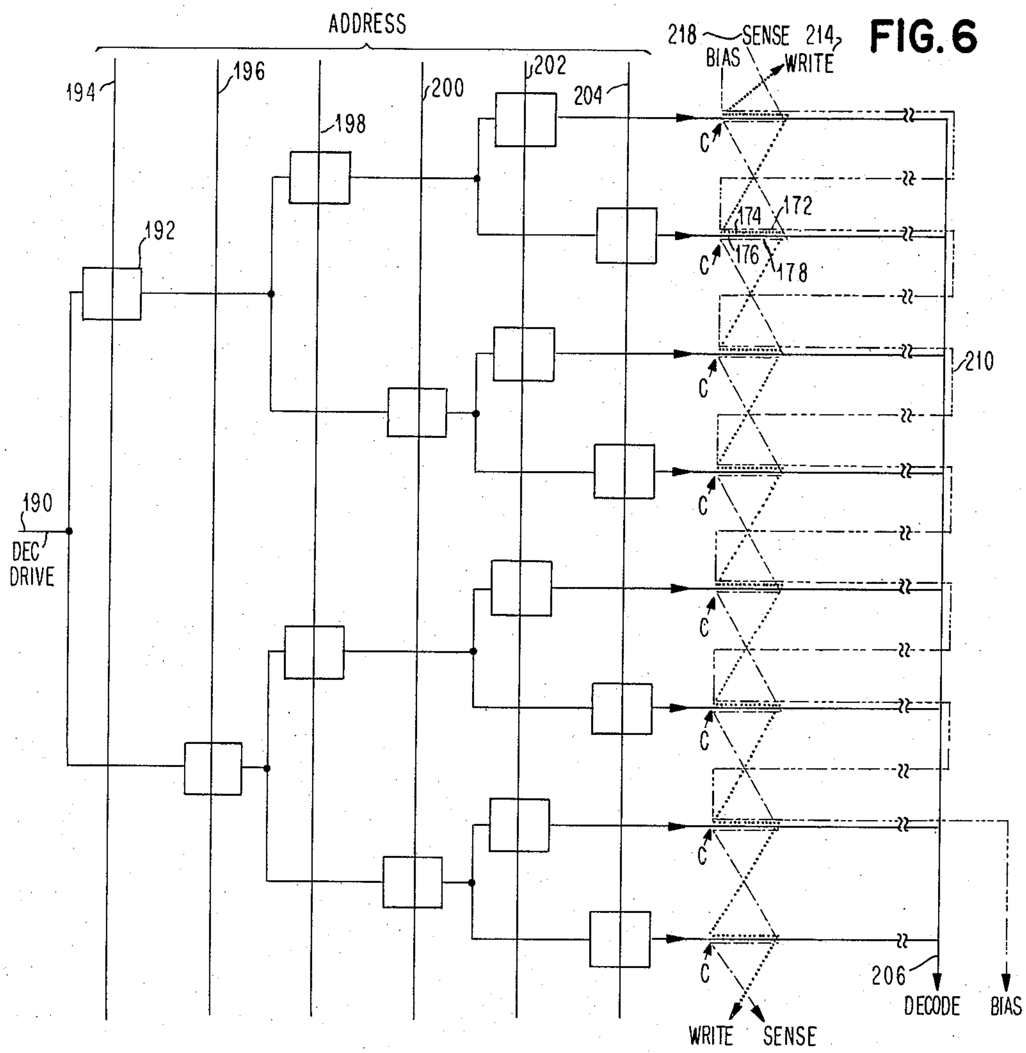
Figure 5:
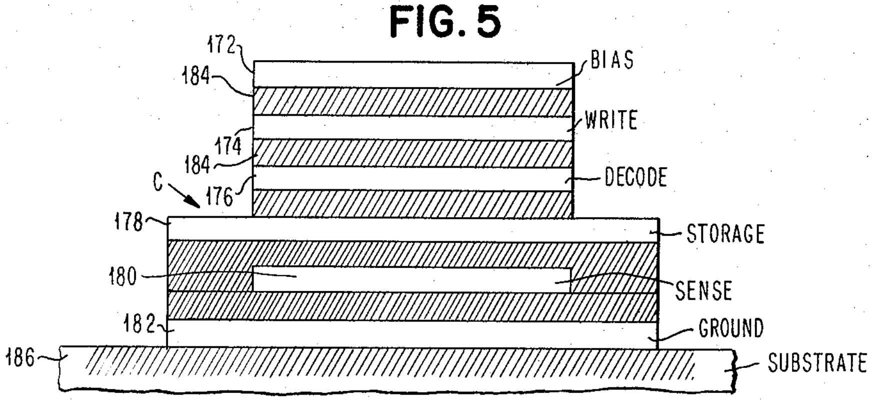

FIG. 5 is a schematic cross-sectional showing another form of memory cell in accordance with the invention, in this case employing the principle of variable shielding for detecting the resistive or superconductive state of the cryogenic element whose hysteresis characteristics are employed in accordance with the invention; and FIG. 6 is illustrative of an addressable multi-word memory arrangement employing cells of the kind illustrated in FIG. 5.

Figure 1:
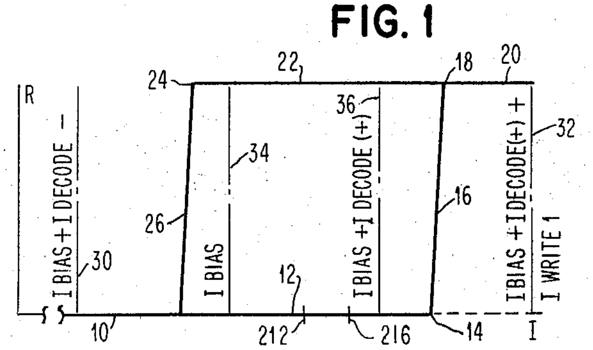
FIG. 1 is a diagram of resistivity versus net control current in a cryogenic element, showing hysteresis in the switching characteristics of the element together with control current values for operation of the element to store binary information in accordance with certain preferred embodiments of the invention.

Referring more particularly to FIG. 1 of the drawings, the hysteresis curve shown is representative of switching characteristics of a cryogenic gate element useful in accordance with the invention. The combination of a cryogenic gate element, together with an associated control conductor, is sometimes known as a cryotron. When the temperature environment of the cryotron gate element is below its critical temperature for a given magnetic field environment, the element exhibits zero resistance, as indicated at 10 in the drawing. As current in cooperating control conductor means is brought up, the cryotron gate element continues to be superconductive, as indicated at 12, until the magnetic field caused by the control current reaches a critical value, at 14, whereupon the gate element switches abruptly as indicated at 16 to a normally conducting state having a finite resistance value as indicated at 18. Further increases in control current produce little change in resistivity, indicated at 20, and, as shown at 22, no drop in resistivity is seen until the control currents fall to the value of the negative going knee 24 of the hyteresis loop, whereupon the resistivity seen falls abruptly as indicated at 26 to the initial, zero value.

Now if a constant, or bias, control current of a net value falling between the control current value corresponding to the positive going and negative going knees 14, 24 of the hysteresis loop of FIG. 1 is provided, it will be seen that the cryotron gate element will remain in its superconductive state 12 if superconductive or in its normally conducting resistivity state 22 if in the normal state, indefinitely. Accordingly, the device has a bistable character of the kind which is useful for storage of binary information, in arrangements which may vary from simple trigger or latch structures to large arrays of elements for multi-word memory storage. Particularly in such arrays, it is conventional to utilize some sort of decoding signal which is routed to a selective bit or word location at which information is to be written or read, and, as will become apparent hereinafter, memory arrangements of the present invention then lend themselves to this kind of operation.

Figure 2:
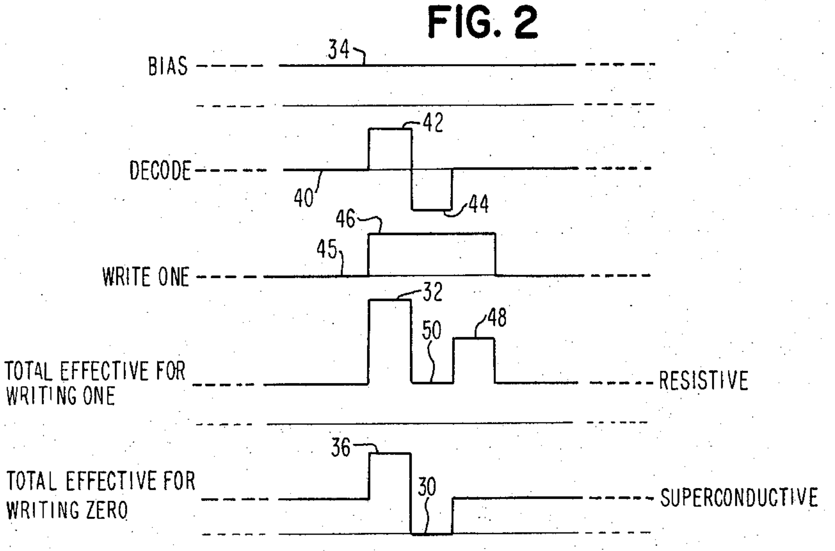
FIG. 2 is a timing chart showing a typical relationship of control current components for operation of a cryogenic element in the manner illustrated in FIG. 1.

FIG. 2 shows a combination of bias and varying control currents arranged for cooperation to provide net control current levels as indicated in FIG. 1 at 30 for writing "zero," at 32, for writing "one," and at 34 and 36 for maintaining bias conditions which preserve the previously written information values. In the illustrated arrangement, "one" is represented by the cryogenic element being in the resistive (that is, normally conductive) state and storage of a "zero" is represented by having the element in the superconductive state. The bias 34 (FIGS. 1 and 2) has a steady value falling well within the hysteresis loop, and the memory element select, or decoded address command signal 40 is bipolar so as to have one excursion 42 poled and arranged to be additive to the bias 34 to make a total value as shown at 36 and a negative or opposite going excursion 44 which is subtractive with respect to the bias 34 so as to yield a net value therewith as shown in 30 in FIGS. 1 and 2. It will be seen from examination of FIG. 1 that the sum 36 is insufficient to drive the element resistive whereas the difference 30 would drive it superconductive every time. To enable driving the cryogenic element to its resistive state, a "write 1" pulse 46 is provided which combines with the subtotal 36 of the bias and decode signals to yield a switching signal 32 (FIGS. 1 and 2) which is amply more than the positive or resistive going knee 14 of the hysteresis loop to insure switching the element to its resistive state as indicated at 20, FIG. 1. Whenever the select or decode signal 40 is impressed upon the element in the presence of the constant bias 34 but in the absence of the "write 1" signal 46, the relatively negatively going, bias opposing portion 44 thereof operates to cancel the effect of the bias. As shown at 30 in FIGS. 1 and 2, this cancellation is sufficient to drive the element well past the negative or superconductive going knee 24 of the hysteresis loop so as to place the cell in the superconductive region 10 as shown in FIG. 1.

Under the convention adopted in this illustration, that is superconductive equals zero, this is the means for writing a zero in the memory cell. In other words, the decode signal plus the "write 1" signal is effective to write one and the decode signal alone is effective to write "0," each, of course, in the presence of the bias signal. In order to avoid inadvertent writing of a "0" when it had been intended that a "1" would be written, it is preferred that the "write 1" signal 46 be arranged to persist beyond the termination of the decode signal so as to assure maintenance of the superconductive state of the cell element until the negative going portion 44 of the decode signal is well over. This results in a second positive going spike 48 in the total signal impressed upon the cell element when writing one, after the intermediate portion 50 of that total signal but this is of no consequence.

Figure 3:
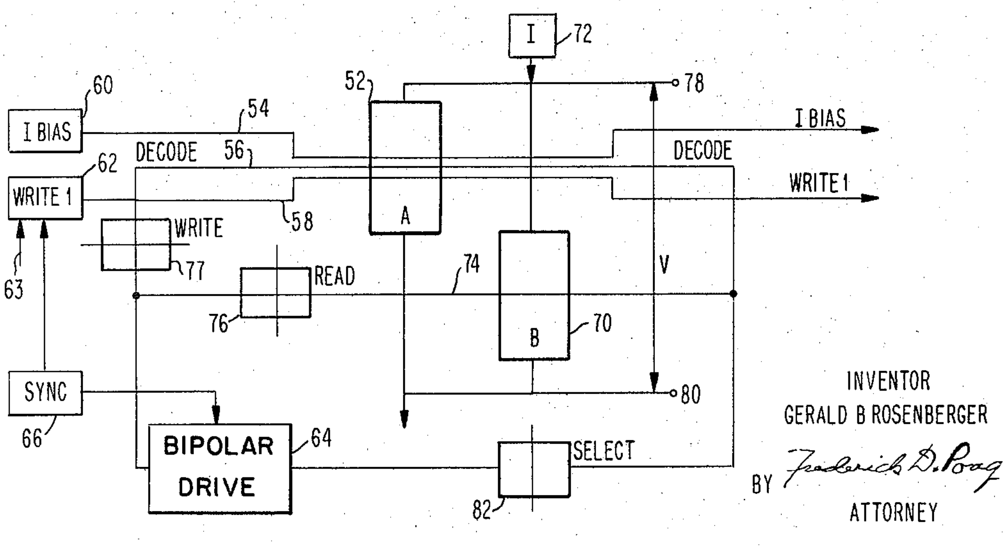
FIG. 3 is a schematic diagram of a memory cell and associated control and sense circuitry arranged for operation in accordance with the principles shown in FIGS. 1 and 2.

Referring now to FIG. 3, a preferred arrangement for employment of a cryogenic element as aforedescribed, including readout means to make it a complete memory cell, is shown. In this arrangement, a cryogenic gate element 52 is provided with superposed or otherwise cooperatively arranged control lines 54, 56, 58 to impress bias, decode and "write 1" signals on the cell 52, in the form and relationship shown at 34, 40, and 45 respectively in FIG. 2. For this purpose any suitable sources indicated schematically at 60, 62, 64 may be provided, with required synchronization between the bipolar drive 64 and the write signal 62 being provided in any suitable or conventional manner as indicated by the diagrammatic showing of a synchronizing source 66. As aforedescribed, presence of a write pulse (46) on line 58 durng the "decode" pulse (42) on line 56 causes storage of a "1," while absence of the write pulse during that time (specifically, during pulse 44) causes storage of a "0." Accordingly, the "write 1" pulse source 62 has an information input control indicated at 63.

Preferably, the gate element 52, hereinafter referred to as an "A" element, is of thin film construction and may have the general form which is well-known and customary in the construction of cryotrons. For example, it may be built up on a suitable substrate by high vacuum (e.g. $10^{-7}$ mm. Hg) deposition techniques, having the usual multilayer structure comprising a ground plane of relatively "hard" superconductive material such as lead which does not switch during operation of the device, covered by insulating material such as silicon monoxide, superimposed upon which is the nucleating layer (for example, copper about ten angstroms thick) for the gate element "A," then the element "A" itself, followed by further layers of silicon monoxide interpersed with the various control lines 54, 56 and 58. The control lines are, of course, of relatively hard superconducting materials such as lead which does not switch during operation of the device and are superposed so as to provide a geometrically combined, net field effect on the element "A" as desired. Of course, one of the chief characteristics desired in the element "A" is a hysteresis loop characteristic with sufficient openness, that is, difference between its resistive going and superconductive going switching points (for example, values 14 and 24 in FIG. 1) to facilitate the fixing of the above described control current operating points between those values, without unduly stringent tolerances. For providing the desired, relatively open hysteresis loop characteristic, it is preferred that the material of element "A" be tin, made relatively large grained, as by maintaining the substrate at an elevated temperature (for example, 100° C.) during deposition of the tin. Of course, avoidance of detrimental edge effects is also desirable, and known techniques for this purpose, for example as set forth in U.S. Patent No. 3,091,556, may be employed. Other techniques which lead to an open hysteresis loop characteristic include omitting the usual nucleating layer so that the result is deliberately large-grained; in such cases, of course, discontinuities may result in the superconducting current path if the substrate temperature is too high.

For reading out the information stored in the element 52, the "A" element, a second cryotron 70, hereinafter referred to as a "B" cryotron, is provided in a parallel combination with the "A" cryotron fed by a constant current source 72. The "B" cryotron 70 is provided with a control line 74 energized from any suitable source, such as the drive 64 through a cryogenic or other control device 76, to drive the B cryotron resistive when readout of the memory cell arrangement is desired. Similarly, a cryotron or other suitable control device 77 is provided in the "DECODE" bipolar control current line 56 to element "A." When the "B" cryotron is thus rendered resistive, a continuing voltage will appear across output terminals 78, 80 if cryotron "A" is also resistive. However, except for a short transient, no voltage will be seen across these terminals if cryotron "A" is superconductive.

The geometrical arrangement of the "B" cryotron can be, except for the fact that it has only one control conductor 74, the same as the "A" device. However, it should be noted that hysteresis is not, per se, a useful attribute in the "B" device and, in the arrangement of FIG. 3, it is desired that the "B" element switch with a smaller signal than the "A" element since it is to be driven resistive by the signal on line 74 from the bipolar source 64 alone. For providing a relatively more collapsed hysteresis loop, a lower substrate temperature can be used during the evaporation of the "B" element, and for providing a sufficiently low threshold of switching, the critical temperature of the gate element of the "B" device can be lowered by introduction of a suitable non-superconductor such as copper during deposition of that gate element, as by known multilayering techniques. Alternatively, of course, the bipolar source could be arranged to be automatically overdriven for providing a larger control signal to the "B" device during the information readout operation.

In the arrangement of FIG. 3, a control, such as a cryogenic gate 82 is provided for activating the cell A–B for either read or write activties. In an array of such cells, this control of the output of the bipolar drive 64 can be operated by a decoder so as to select operation of the associated cells compared to the others in the array, and for this reason, the output of bipolar drive as controlled by this "Select" element 82 is referred to as the decoder output. It will be understood that in data processing machines employing memories, there is usually what is known as a "memory cycle" in which all read and write operations are commanded in the proper sequence and timing. In FIG. 3, means 66, for synchronizing the write pulse from source 62 with the bipolar signal from drive 64, is shown with particularity in view of the timing relation of the "write" pulse 46 with the "decode" pulses 42, 44 as above described. However, it will be understood that this is merely part of the over-all memory cycle and control features which may be otherwise required or desired.

Figure 4:
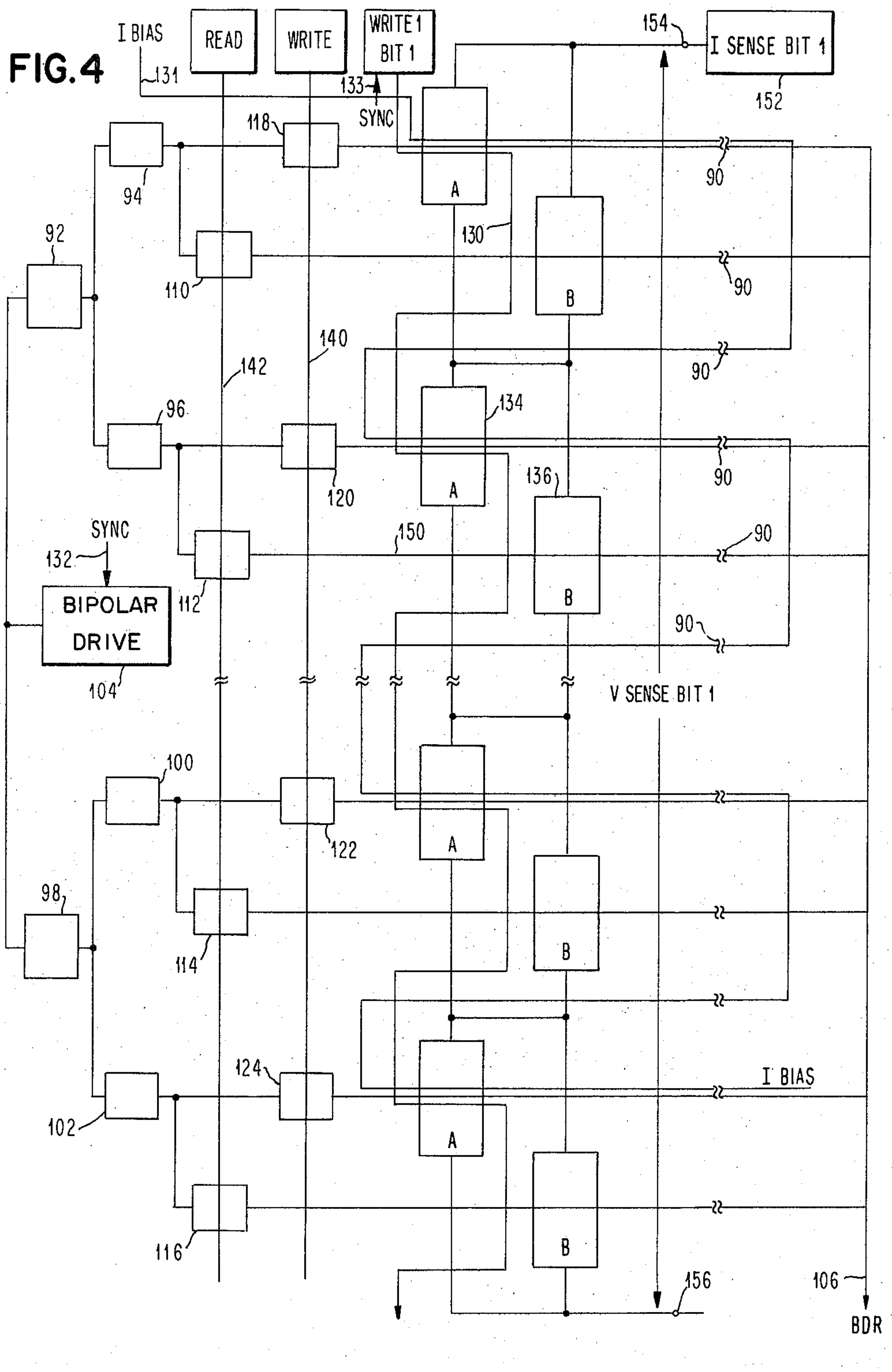
FIG. 4 is illustrative of a memory arrangement employing a number of the memory cells of FIG. 3 in an addressable multi-word memory arrangement.

Referring to FIG. 4, an array of memory cells of the kind shown in FIG. 3 can be arranged to enable multi-word, multi-bit storage of information. For simplicity, only the "A"–"B" cell for the first bit position of each word is shown. It will be understood that each word normally contains a number of bits as indicated by the breaks 90 in the drawing. The decoding function is provided by a "Christmas Tree" decoder arrangement of cryotrons 92, 94, 96, 98, 100, 102 which controls flow of "decode" current from the bipolar drive 104 through the "A" elements of the selected word. A common return for the bipolar current is provided at 106. The memory array of FIG. 4 is arranged for writing or reading one word at a time, each bit in the word being operated upon simultaneously, in a parallel type read or write operation. Accordingly, each word has but one read control cryotron 110, 112, 114, 116 (analogous to read control device 76 of FIG. 3), and one write control cryotron 118, 120, 122, 124 (analogous to write control device 77 of FIG. 3). In further analogy to the single cell arrangement of FIG. 3, each bit position of the memory array of FIG. 4, such as the "bit 1" position shown, has a "write 1" line 130 arranged in control relation to all of the "A" elements of that bit position. When it is desired to write a "1" into that position of a particular word that has been activated by operation of the decoder, a pulse of the kind and timing shown at 46 in FIG. 2 is gated through line 130. This pulse, and a constant bias through line 131, cooperate with the decoder output to the selected "A" cell. The required synchronization between the operation of the bipolar drive and the "write 1" pulse, as shown in FIG. 2, is indicated schematically in FIG. 4 at 132 and 133.

Recapitulating operation of the aforedescribed hysteresis memory cell in the environment of a member array of FIG. 4, let it be assumed that it is desired to write a "1" in the first bit position of the second word of the memory array represented by the memory cell having "A" element 134 and "B" element 136. The usual instruction inputs (not shown) to the decoder would condition cryotron or other control elements 92, 96 to admit bipolar drive current to the selected word array exclusively, and the "write" control current on line 142 set (i.e. off or down) to place cryotron 120 in conducting condition. The "read" control current on line 142 would be at its normal, quiescent full value so that cryotron 112 would remain in resistive condition. Then, in proper synchronism with the bipolar drive operation, a "write 1" pulse such as pulse 46 of FIG. 2 is admitted to conductor 130 whereupon element 134 is placed in resistive condition as indicated at 20, FIG. 1. The bias current such as indicated at 34 in FIG. 2 is, of course, impressed upon the element 134 continuously through line 131. This operation having been completed, the write control cryotron 120 would be again rendered resistive by restoration of the normal, full value control current on its control line 140. At the completion of this sequence of operation, the element 134 of FIG. 4 is left in its resistive state, as shown at 22, FIG. 1. If, on the other hand, it had been desired to write a "0" in element 134, the procedure would have been the same except that there would be no current pulse impressed on line 130, and the element 134 would be driven to and left in the superconducting condition shown at 10 in FIG. 1, in the manner aforedescribed.

When it is desired to read out the contents of the bit position represented by the "A"–"B" cell 134, 136, it is necessary only to condition the decoder gates 92, 96 for superconduction as aforedescribed and render the "read" cryotron 112 superconductive by removing or lowering the current on its control line 142. Control line 140 remains normally energized and the "write" cryotron controlled thereby remains resistive. Thus the bipolar drive "decoder" current is admitted through line 150 to the "B" element 136 of the cell in question so as to drive it resistive. As in the case of the cell of FIG. 3, voltage sensing is provided by a constant current source 152 fed to the parallel combination of the "A"–"B" gate elements 134, 136, as shown. As before, when both of these elements are resistive a voltage output is yielded, as at terminals 154, 156 across this parallel array to indicate a storage of a "1" therein, while if both are superconductive, no such output voltage is seen across terminal 154, 156.

FIG. 5 is a cross-sectional diagram illustrative of a memory cell "C" of the invention wherein the hysteresis in the cryogenic memory element is utilized to "gate" magnetic flux rather than directly as a current gate. In the cell "C," the status to be detected is ultimately the same as in the above described "cryotron" current gate type arrangements, that is, the conductivity state, the superconductive or resistive, of a cryogenic element having hysteresis. However, the field shielding effect of the cell "C" of FIG. 5 lends itself to employment in arrangements which allow for certain simplification in the readout scheme, as will be described.

In the example of FIG. 5, the cell comprises a film 172 acting as a "bias" line, a film 174 provided as a "write" line, and a film 176 which serves as a "decode" line. These control line films may be of a hard superconductive material such as lead, and are arranged in a manner to provide a net control field effect on another layer or film 178 which is the storage element. The storage film or element 178 may be a thin film of tin having hysteresis characteristics identical to those of the above described "A" element. Beneath the storage film or element 178, and smaller than the same so as to be shielded thereby from the control lines 172, 174 and 176, is a sense element film 180 which is used, as will appear, as a cryogenic gate and is therefore of relatively "soft" (that is, easily switchable) superconductive material. Thus, similarly to the "B" element above described, the said element 180 of FIG. 5 may be of tin, with its critical temperature adjusted as desired, as by introduction of copper thereinto by multilayering during the deposition of the element 180. Beneath the sense element 180 is the conventional ground plane 182 which, as usual, may be of lead or other suitable non-switching, "hard" superconductive material. As shown, the several layers are insulated from each other by silicon monoxide or other suitable material 184, and the assembly includes a suitable support substrate 186.

Referring now to FIG. 6, the cells "C" of FIG. 5 lend themselves to employment in an array having facilities for non-destructive readout in a simplied manner. For simplicity, the cells "C" are shown in a symbolic manner, with the storage elements 178 not shown, but the bias, write, decode, and sense film elements 172, 174, 176, and 180 thereof shown as horizontal line segments arrayed in horizontal super-position in the manner of the cross section of FIG. 5. Again, only the first bit position of each of a plurality of memory words locations is shown, but it will be understood that each word could have any number of bits, as indicated by the breaks in the bias and decode lines of the individual words.

The illustrated memory includes a decoder having a drive source 190 and a plurality of switching devices such as cryotrons (e.g. 192) under the control of lines 194, 196, 198, 202 and 204. As is well understood in the art, means (not shown) are provided to energize these control lines in accordance with the address of the memory word selected for read or write operations. Thus, for selection of one of the memory words of the array, the decoder is operated to conduct current from the source 190, through one of the decode lines incorporating the decode conductor elements 176 of the cells of the word to be selected, to a decode current drain 206. A constant current bias supply connects all of the bias conductor films 172 of the cells in the memory in series, as indicated by the bias conductor 210. All of the "write" conductor elements 174 of the cells "C" in a given bit position are connected in series with a bidirectional write signal source indicated at 214, and all of the sense conductors 180 of the cells in a given bit position are connected in series in a sense circuit 218 as shown.

The circuit arrangement of FIGS. 5 and 6 again utilizes a combination of bias, decode and write signals to take advantage of the hysteresis characteristic shown in FIG. 1. In this case, the bias current carried by line 210 of FIG. 6 is fixed at a constant value about midway between the switching thresholds of the memory element (178), as indicated at 212 in FIG. 1. Once again the decoder drive 190 is bipolar but in this case has a peak-to-peak swing which cooperates with the bias current value 212 to bring the subtotal net effect of variation in control current resulting from the action of the bias and decoder current to a swing between lines 34 and 36 in FIG. 1. Added to this is the bidirectional "write" signal of circuit 214. This write signal is poled to be positive (that is, arithmetically additive to the bias, decode subtotal) when a "1" is to be written, and to be negative when a "0" is to be written. When added to the bias 212 and a like excursion of the decode signal (that is, to the subtotal net value of line 36, FIG. 1) such a "write 1" signal brings the total control current effect to that which will switch the storage element 178 to its resistive condition, such as to the net value shown by line 32. Similarly, a write "0" pulse, of opposite polarity to the write "1" pulse will combine with the subtotal net effect of the bias and negative-going decoder excursion of line 34, to yield a net control current effect represented by line 30 and therefore drive the element 178 superconductive.

For reading out information stored at a given memory address in the arrangement of FIG. 6, the decoder lines 194, 196, 198, 200, 202, 204 are activated in a manner to select the memory word location in question. Thus, bipolar "decode" current is admitted from source 190 to the decode (176) conductor films of the selected word. This current, together with the constant bias current, will result in subjecting the storage elements 178 of the cells "C" of that word to a net effective control current swing between lines 34 and 36, FIG. 1. It will be seen from FIG. 1 that, on account of the hysteresis characteristic of the storage elements 178, this imposition of control current thereon will not cause any change in the stored resistive or superconductive (22, 12) state thereof. Since, as is well-known, a superconductive plane is a perfect shield against transmission of magnetic fields, the storage elements (178) of the cells "C" in question will, wherever the storage element is superconductive (12, FIG. 1), shield the sense conductor 180 from the currents in the control lines thereabove.

However, if the storage film or element 178 is in its resistive condition (22, FIG. 1) it will allow the magnetic field resulting from the net control current on the lines 172, 174, 176 to pass through and effect the sense element 180. The sense element 180, is, in effect, a cryotron gate element having a switching threshold which is made such that the element 180 will become resistive when exposed to a field effect corresponding to value 216, FIG. 1. Since this value is less than the value of the line 36 which results from the combination of the bias and decode signals applied to the cell, the sense element will go resistive, a fact which can be detected in any suitable manner, as by applying a constant current through the sense line and measuring the voltage drop across the sense line, or by causing the resistance introduced in this line to effect a switching of the current from that line to another one, all as is well understood in the art.

From the foregoing it will be appreciated that the invention provides advantageous arrangement for employing hysteresis effects such as may be obtained in the operation of cryogenic devices. It will be seen that in the combination of bias, bipolar-select (decode), and write signals, means are provided whereby the memory element can be driven resistive or superconductive in the desired selective manner, and that the hysteresis type of storage, as employed in accordance with the invention, provides for non-destructive readout of the information stored.

Specifically, means are taught in FIGS. 3 and 4 for reading out the stored information by use of individual sense cryotron "B" associated with the memory elements "A," themselves of a cryotron-gate kind. This embodiment provides rather broad signal tolerances and employs relatively simple gate structures.

In the case of the arrangements of FIGS. 5 and 6, the switchable shielding characteristic of the memory element is utilized, and the same decode line (176) serves for read and write selection. Thus, the bias and decode signals of FIG. 6 cycle the cell within the confines of the hysteresis loop during readout, but when added to a bidirectional write signal they provide for excursions outside of that loop in the desired direction. This facilitates the provision of a cell utilizing the controllable shielding effect of the hysteresis-characterized storage element to provide a multilayer cell having both storage and sense facilities in the same sandwich element.

Favorable cryogenic superconductivity hysteresis characteristics are found in thin film elements in the order of one micron thick especially when prepared as described above with reference to elements 52 and 178.

While the invention has been particularly shown and described with reference to preferred embodiments thereof, it will be understood by those skilled in the art that various changes in form and details may be made therein without departing from the spirit and scope of the invention.

What is claimed is:

1. In a cryogenic memory apparatus,
   a storage element of superconductive material having hysteresis in its superconductive-resistive switching characteristics,
   means for maintaining the operating condition of said storage element normally within the bounds of the hysteresis loop defined by said switching characteristics,
   means for driving the operating conditions of said storage element outside of said hysteresis loop for changing the conductivity state thereof, and
   cryotron gate means associated with said element to be shielded thereby when said element is superconductive,
   at least certain of the control means of said apparatus being effective to expose said cryotron gate means to a magnetic field of a level sufficient to switch said cryotron means when said storage element is resistive.

2. A cryogenic memory apparatus comprising,
   a plurality of storage elements, each of superconductive material having hysteresis in its superconductive-resistive switching characteristics,
   control means for said storage elements comprising bias current means for maintaining the operating condition of said storage elements normally within the bounds of the hysteresis loop defined by said switching characteristics, and bipolar select and bidirectional write current means for driving the operating conditions of said elements outside of said hysteresis loop for changing the conductivity state thereof,
address decoder means adapted to direct said bipolar current means into control relation with said storage elements selectively,
cryotron gate means associated with each said storage element to be shielded thereby when said element is superconductive,
the combination of said bias and select currents of said control means being effective to expose said cryotron gate means to a magnetic field of a level sufficient to switch said cryotron means when the associated said storage element is resistive.

3. A cryogenic memory apparatus comprising,
a storage element of superconducting material having hysteresis in its superconductive-resistive switching characteristics, and
control means for said element comprising,
bias means operative to condition said element in an operating condition falling within the hysteresis loop defined by its switching characteristics,
bipolar select control means operative to add algebraically to said bias means, and
information writing control means operative to add to the combined effect of said bias and select control means to cause an excursion of the operating condition of said cell outside of said hysteresis loop.

4. A cryogenic memory apparatus comprising,
a plurality of storage elements, each comprising superconducting material having hysteresis in its superconductive-resistive switching characteristics, and
control means for said elements comprising,
bias current means operative to condition each of said elements in an operating condition falling within the hysteresis loop defined by its switching characteristics,
select control means comprising bipolar current source means and address decoder means adapted to direct said bipolar current into control relation with said elements, said bipolar current being operative to add to the effect of said bias means, and
information writing control current means operative to add to the combined effect of said bias and select control means to cause an excursion of the operating condition of the selected storage element outside of said hysteresis loop.

5. In a cryogenic memory device,
a memory cell comprising
a first cryogenic gate element having hysteresis in its switching characteristics,
a second cryotron gate element connected in parallel with said first element in series with a current source,
means for maintaining the operating conditions of said first element normally within the hysteresis loop defined by its switching characteristics,
means for driving the operating conditions of said first element outside of said loop in a direction indicative of information to be stored therein, and
means for driving said second element resistive for testing the conductivity state of said first element.

6. In a cryogenic memory device,
a memory cell comprising
a first cryogenic gate element having hysteresis in its switching characteristics,
a second cryotron gate element connected in parallel with said first element in series with a current source,
bias means for maintaining the operating conditions of said first element normally within the hysteresis loop defined by its switching characteristics,
control means for driving the operating conditions of said first element outside of said loop in a direction indicative of information to be stored therein,
and said control means comprising bipolar signal means and write signal means, said bipolar signal means and said bias means being adapted to provide a combined signal operative to drive said operating conditions outside said loop in one direction, and said write signal means being operative to overcome said combined signal and drive said operating conditions outside said loop in the other direction,
and means for driving said second element resistive for testing the conductivity state of said first element.

7. A cryogenic memory apparatus comprising,
a plurality of memory cells, each said cell comprising a first cryogenic gate element having hysteresis in its switching characteristics and a second cryotron gate element connected in parallel with said memory element in series with a current source,
bias current means for maintaining the operating conditions of said first elements normally within the hysteresis loop defined by their switching characteristics,
control means for driving, selectively, the operating conditions of each said first element outside of said loop in a direction indicative of information to be stored therein,
said control means comprising bipolar current signal means and write current signal means, said bipolar signal means and said bias means being adapted to provide a combined signal operative to drive said operating conditions outside said loop in one direction, and said write signal means being operative to overcome said combined signal and drive said operating conditions outside said loop in the other direction, and address decoder means adapted to direct said bipolar signal means into control relation with said first elements selectively,
and means for driving said second elements resistive for testing the conductivity state of said first elements.

8. In a cryogenic memory apparatus,
a storage element of superconductive material having hysteresis in its superconductive-resistive switching characteristics,
control means for said storage element comprising,
means for maintaining the operating condition of said storage element normally within the bounds of the hysteresis loop defined by said switching characteristics, and means for driving the operating conditions of said storage element outside of said hysteresis loop for changing the conductivity state thereof, and
magnetic field sensing means associated with said storage element to be shielded thereby when said storage element is superconductive,
said control means being effective to expose said sensing means to a magnetic field of a level sufficient to be detected by said sensing means when said storage element is resistive.

References Cited by the Examiner

UNITED STATES PATENTS 3,119,986 1/1964 Fowler ---------- 340—173.1

ARTHUR GAUSS, *Primary Examiner.*

D. D. FORRER, *Assistant Examiner.*